United States Patent
Beaver et al.

(10) Patent No.: US 10,308,123 B2
(45) Date of Patent: Jun. 4, 2019

(54) VEHICLE-SIDE BEACON MODE FOR WIRELESS ELECTRIC VEHICLE CHARGING

(71) Applicant: WiTricity Corporation, Watertown, MA (US)

(72) Inventors: Jonathan Beaver, Auckland (NZ); Chang-Yu Huang, Auckland (NZ); Michael Le Gallais Kissin, Auckland (NZ); Nicholas Athol Keeling, Munich (DE); Mickel Bipin Budhia, Auckland (NZ)

(73) Assignee: WiTricity Corporation, Watertown, MA (US)

( * ) Notice: Subject to any disclaimer, the term of this patent is extended or adjusted under 35 U.S.C. 154(b) by 63 days.

(21) Appl. No.: 15/491,697

(22) Filed: Apr. 19, 2017

(65) Prior Publication Data

US 2018/0304755 A1     Oct. 25, 2018

(51) Int. Cl.
*H02J 7/00* (2006.01)
*B60L 11/18* (2006.01)
*H02J 50/12* (2016.01)
*H02J 7/02* (2016.01)

(52) U.S. Cl.
CPC ............ *B60L 11/182* (2013.01); *H02J 7/025* (2013.01); *H02J 50/12* (2016.02); *Y02T 10/7005* (2013.01); *Y02T 10/7088* (2013.01)

(58) Field of Classification Search
USPC ........................................................ 320/108
See application file for complete search history.

(56) References Cited

U.S. PATENT DOCUMENTS

| | | | |
|---|---|---|---|
| 9,024,578 B2 | 5/2015 | Fisher | |
| 2010/0201314 A1* | 8/2010 | Toncich | H02J 7/007 320/108 |
| 2010/0235006 A1 | 9/2010 | Brown | |
| 2011/0254377 A1* | 10/2011 | Wildmer | B60L 11/182 307/104 |
| 2012/0104998 A1 | 5/2012 | Takada et al. | |
| 2014/0159656 A1* | 6/2014 | Riehl | H01F 38/14 320/108 |
| 2015/0061576 A1* | 3/2015 | Chen | B60L 11/182 320/108 |
| 2016/0023557 A1 | 1/2016 | Dimke et al. | |
| 2016/0059725 A1 | 3/2016 | Kim | |

* cited by examiner

*Primary Examiner* — Samuel Berhanu
(74) *Attorney, Agent, or Firm* — Colby Nipper

(57) ABSTRACT

The present disclosure describes aspects of a vehicle-based beacon mode for wireless electric vehicle charging. In some aspects, a circuit for receiving wirelessly transferred power includes a coil connected to boost circuitry configured to convert received power to a form suitable for storage. The circuit also includes beacon circuitry connected to a voltage source that, in combination with portions of the boost circuitry, enables current to be driven into the coil to generate a beacon signal. Based on this beacon signal, a base charging unit can detect the presence of the circuit and initiate the wireless transmission of power to the circuit without additional out-of-band communication. Further, the beacon circuitry may be compatible with, or protected from, current of the received power such that the circuit can seamlessly transition from generating the beacon signal to converting the received power without active reconfiguration, synchronization, or state control.

30 Claims, 12 Drawing Sheets

VEHICLE-SIDE BEACON MODE FOR WIRELESS ELECTRIC VEHICLE CHARGING

BACKGROUND

Field of the Disclosure

This disclosure relates generally to wireless power transfer systems, more specifically to electric vehicle charging systems.

Description of Related Art

This description of related art is provided for the purpose of generally presenting a context for the disclosure that follows. Unless indicated otherwise herein, concepts described in this section are not prior art to this disclosure and are not admitted to be prior art by inclusion herein.

Wireless charging systems enable the charging of portable devices (e.g., electric vehicles) when the devices are positioned near a charging pad of a base charging unit. Power is transferred from the charging pad to the device through two magnetically coupled coils, a primary coil of the charging pad and a secondary coil in the device. To do so, an inverter of the base charging unit drives the primary coil to generate a fluctuating magnetic field, which through magnetic coupling, induces voltage in the secondary coil to power the device.

In most wireless power transfer systems, power is transferred from a stationary or fixed pad to a pad of a mobile device or vehicle. Typically, the transfer of power is coordinated or initiated by detecting, identifying, and aligning the mobile pad with respect to the fixed pad. As such, each of the fixed and mobile portions of the system often include respective circuits or sensors that enable the detection, identification, and alignment of the mobile pad. Although there are many ways to accomplish this, conventional approaches rely on additional detection circuitry or communication systems, which add cost and complexity to the wireless power transfer system.

SUMMARY

In some aspects of vehicle-side beacon mode for wireless electrical vehicle charging (WEVC), a circuit for receiving wirelessly transferred power includes a coil connected to boost circuitry configured to convert the received power to a form suitable for storage. The circuit also includes beacon circuitry connected to a voltage source that, in combination with portions of the boost circuitry, enables current to be driven into the coil to generate a beacon signal. Based on this beacon signal, a base charging unit can detect the presence of the circuit and initiate the wireless transmission of power to the circuit without additional out-of-band communication. Further, the beacon circuitry may be compatible with, or protected from, current of the received power such that the circuit can seamlessly transition from generating the beacon signal to converting the received power without active reconfiguration, synchronization, or state control.

The foregoing summary is provided to briefly introduce some of the aspects described herein. This summary is not intended to identify key or essential features of these or other aspects that are further described throughout the disclosure.

BRIEF DESCRIPTION OF DRAWINGS

The details of various aspects are set forth in the accompanying figures and the detailed description that follows. In the figures, the left-most digit of a reference number identifies the figure in which the reference number first appears. The use of the same reference numbers in different instances in the description or the figures indicates like elements.

DETAILED DESCRIPTION

Figure 1:
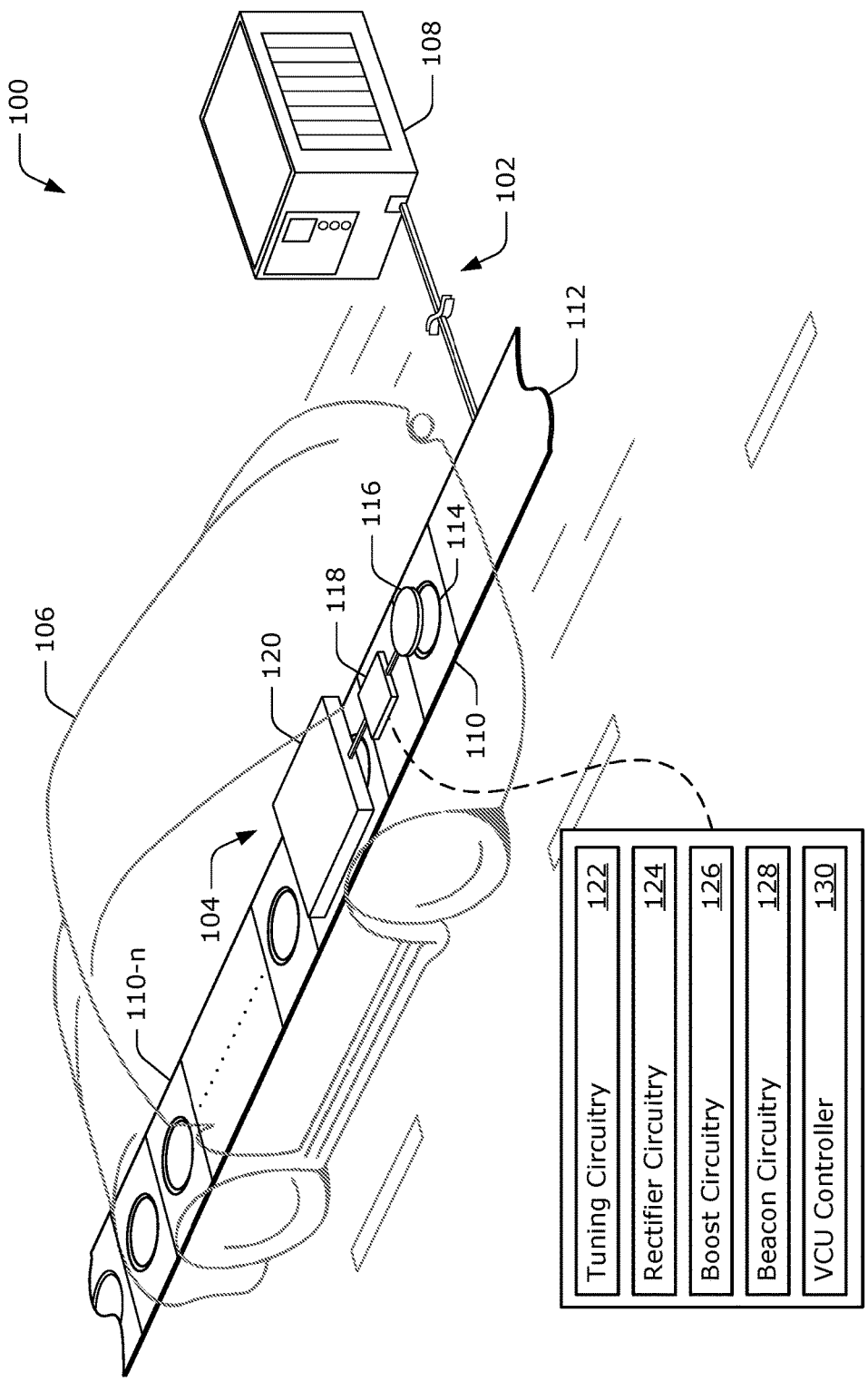
FIG. 1 illustrates an example environment that includes a wireless charging system for an electric vehicle in accordance with one or more aspects.

Base charging stations in conventional wireless charging systems typically detect, identify, and verify alignment with an electric vehicle before initiating transmission of charging power. For example, a base charging station may detect proximity with the electric vehicle, establish communication with a charging unit of the vehicle for identification and coordination of charging activities, and verify alignment of respective power transfer coils before initiating the transmission of power. Although these pre-charging activities are normally performed to ensure the presence of the electric vehicle to avoid foreign object or exposure compliance issues, each step increases complexity of the charging process and delays the transfer of power. The complexity of this process and associated delay can be critical for system performance, especially in dynamic systems where the electric vehicle present over a base pad for only a brief amount of time.

Further, to enable this process of presence detection, communication, and alignment between the base charging station and the electric vehicle, each side of the system typically includes respective sensing circuitry, control modules, and a communication link. In addition to power transfer circuitry, this extra hardware and software increases complexity, product development time, and overall cost of the wireless charging system. As such, conventional wireless charging systems and charging processes are often viewed as slow, overly complex, and expensive by users of electric vehicles.

This disclosure describes aspects of a vehicle-side beacon mode for wireless electric vehicle charging (WEVC). Apparatuses and techniques described herein may generate a vehicle-side beacon signal that is capable of seamlessly initiating transmission of power from a base charging unit. For example, the base charging unit may rely on the beacon signal for presence detection and initiate the transmission of power to the electric vehicle without first establishing communication with the electric vehicle, thereby improving system responsiveness. Additionally, a vehicle-side beacon mode can be implemented by leveraging portions of existing power transfer circuitry, thereby minimizing any increases in cost or system complexity.

In some aspects of vehicle-side beacon mode for WEVC, a circuit of a vehicle charging unit (e.g., power receiving circuit or pad) includes a coil connected to boost circuitry configured to convert the received power to a form suitable for storage. The circuit also includes beacon circuitry connected to a voltage source that, in combination with portions of the boost circuitry, enables current to be driven into the coil to generate the beacon signal. Based on this beacon signal, the base charging unit can detect the presence of the circuit and initiate the wireless transmission of power to the circuit without additional out-of-band communication. Further, the beacon circuitry may be compatible with, or protected from, current of the received power such that the circuit can seamlessly transition from generating the beacon signal to converting the received power without active reconfiguration, synchronization, or state control.

These and other aspects of a vehicle-side beacon mode for WEVC are described below in the context of an example environment, example resonant circuits, and techniques. Any reference made with respect to the example environment or circuit, or elements thereof, is by way of example only and is not intended to limit any of the aspects described herein.

EXAMPLE ENVIRONMENT

FIG. 1 illustrates an example environment in which a wireless charging system 100 is implemented in accordance with one or more aspects. The wireless charging system 100 includes a wireless power transmitter 102 and a wireless power receiver 104. In this particular example, the wireless power receiver 104 is embodied in an electric vehicle 106 (EV 106), and the wireless charging system 100 may be implemented as a wireless electric vehicle charging (WEVC) system or dynamic electric vehicle charging (DEVC) system. Although described with reference to an electric or hybrid vehicle, the wireless charging system 100 may be implemented or scaled to transfer power to any suitable receiver, such as a smart-phone, laptop computer, tablet computer, home appliance, power utility or grid device, electric bicycle, electric train, mobile robotic system, autonomous drones, and the like.

The wireless power transmitter 102 includes a power source 108 and base charging units 110 through 110-$n$ (BCUs 110 through 110-$n$), which are embodied as part of a charging surface 112. The charging surface 112 may be configured for dynamic charging in which the EV 106 receives wireless power during movement along the charging surface 112 in a generally longitudinal direction as shown in FIG. 1. As such, the charging surface 112 may include any suitable number of BCUs 110 through 110-$n$ disposed along the charging surface 112 with any suitable spacing or alignment. Alternately or additionally, the charging surface 112 can be embedded within or situated relative a surface on which the EV 106 travels or parks to facilitate either static or dynamic wireless charging.

The power source 108 may provide direct current (DC) power or alternating current (AC) power to the BCUs 110 through 110-$n$ via any suitable power distribution system or common bus of the charging surface 112. In some cases, the power source 108 includes circuitry for rectification, filtering, or power-factor correction of AC power received from household or commercial AC mains. Alternately or additionally, the power source 108 may provide power to the BCUs 110 through 110-$n$ via modular contacts or pass-through connections embodied in each of the BCUs.

Although not shown, each of the BCUs 110 through 110-$n$ may include a base controller, an inverter, a primary resonant circuit, and a transmitter coil 114 (e.g., primary coil, shown). These entities may be implemented separate from the BCU 110 as individual components or combined with others, such as the power source 108. An inverter of the BCU 110 converts DC power or low frequency AC power provided by the power source 108 to higher frequency (e.g., 20 kHz-120 kHz) AC power suitable for driving the primary resonant circuit.

Generally, the BCU 110 generates or provides AC power at or near a resonant frequency of the primary resonant circuit to facilitate transmission of power from the transmitter coil 114 to a receiver coil 116 (e.g., secondary coil) of a vehicle charging unit 118 (VCU 118) of the wireless power receiver 104. The VCU 118 of the wireless power receiver 104 is coupled to a battery 120 of the EV 106 and includes tuning circuitry 122 to form a secondary resonant circuit with the receiver coil 116. The tuning circuitry may include any suitable combination of parallel or series tuning components (e.g., a parallel capacitor). The primary resonant circuit and a secondary resonant circuit may be configured according to a mutual resonant relationship. In some cases, transmission losses between the transmitter coil 114 and the receiver coil 116 can be minimized when the coils are aligned or tuned such that respective resonant frequencies of the coils are substantially the same or very close.

The VCU 118 of the wireless power receiver 104 also includes rectifier circuitry 124 and boost circuitry 126 for converting power received from the BCU 110 to a form useful to charge the battery 120. In some cases, the rectifier circuitry 124 rectifies AC current generated in the secondary resonant circuit to provide DC current to the boost circuitry 126. The boost circuitry 126 can then convert the DC current to a voltage and corresponding current that is suitable to charge the battery 120 of the EV 106. Alternately or additionally, the VCU 118 may include other types or configurations of power conversion circuitry, such as buck converters, charging modules, current controllers, current injection diodes, voltage multipliers, flyback circuitry, and the like.

The VCU 118 also includes beacon circuitry 128 and a VCU controller 130. The beacon circuitry 128 may include a voltage source, switches, or diodes configured to enable current to be driven into the secondary resonant circuit and receiver coil 116 to generate a beacon signal or field. The VCU controller 130 can manage activities and configurations of the VCU 118 to initiate or coordinate transmission of power from BCU 110 or any of the other BCUs of charging surface 112. In some cases, the VCU controller 130 is embodied as processor-executable instructions stored by a memory device that can be implemented through execution by a processor of the VCU 118. Alternately or additionally, the VCU 118 may communicate with a wireless power network manager or controller to coordinate charging with a BCU connected to the wireless power network. How the beacon circuitry 128 and VCU controller 130 are implemented and used varies, and is described throughout the disclosure.

Although not shown, the VCU 118 of the wireless power receiver 104 may also include a wireless interface configured to establish a communication link with a wireless interface of the BCU 110. The VCU 118 and BCU 110 can communicate to exchange any suitable information, such as beacon signal frequency, beacon signal or field strength (e.g., at particular frequencies), respective coil configurations, coil power ratings, vehicle alignment or positioning information, charging status, fault states, a status of the battery 120, and the like. The communication link may be implemented through one or more wireless networks, such as a wireless local-area-network, peer-to-peer (P2P) network, cellular network, and/or wireless personal-area-network (WPAN). Alternately or additionally, communication may also be established through a backchannel or third party, such as a wireless power network manager or system administrator.

Figure 2:
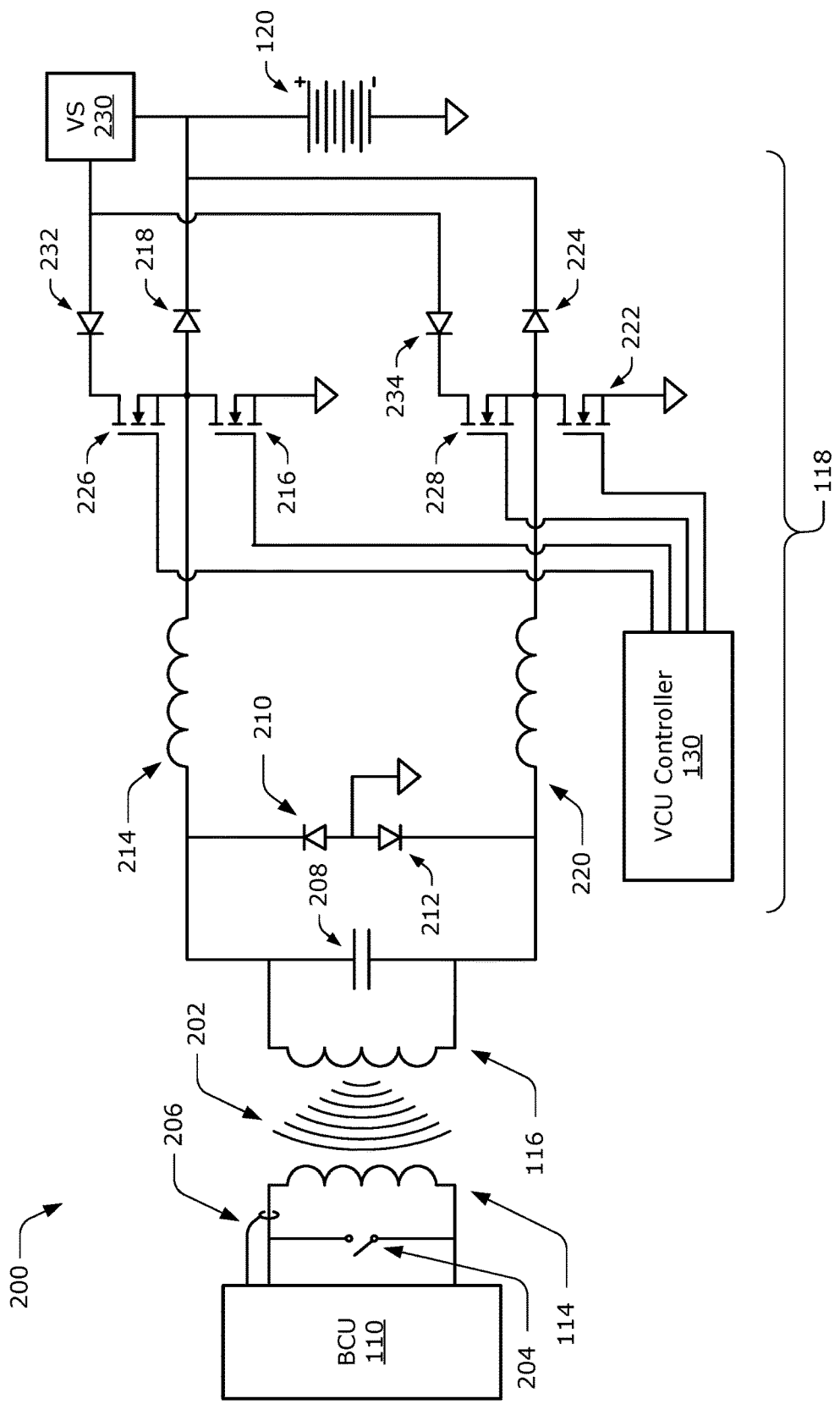
FIG. 2 illustrates an example circuit of a vehicle charging unit that includes boost circuitry and beacon circuitry of FIG. 1.

FIG. 2 illustrates an example circuitry of a wireless charging system at 200 that includes example implementations of the boost circuitry, beacon circuitry, and other entities of FIG. 1. Each of these circuits or entities may be configured similar to, or differently from, those described with reference to FIG. 1 or any other figure. Additionally, the circuitry of FIG. 2 can be implemented in any suitable type of wireless charging system, such as a wireless electric vehicle charging system or dynamic electric vehicle charging system.

In this particular example, the wireless charging system 200 includes a BCU 110 that is configurable to wirelessly transmit power provided by a power supply (not shown) to a wireless power receiver or a VCU 118. Generally, the BCU 110 includes a power transmission mode in which power is transmitted from a primary resonant circuit of the BCU 110 to a secondary resonant circuit of the VCU 118 via a time-varying magnetic (or electromagnetic) field (not shown). The time-varying magnetic field may be generated in accordance with various spectrum allocations or safety guidelines, such as within a frequency band of 81.3 kHz to 90 kHz. An amount of power transmitted or transferred from the primary resonant circuit to the secondary resonant circuit may also vary or depend on respective coil configurations. The respective power ratings of the transmitter coil 114 and receiver coil 116 may be similar or different, and range from 1 kW to over 30 kW depending on a configuration of the wireless charging system 200. Alternately or additionally, the transmitter coil 114 and receiver coil 116 may be configured as any suitable types of coils, such as circular, circular-rectangular, bipolar (e.g., double-D or DD), quadrature, or any combination thereof.

In some aspects, the BCU 110 or wireless power transmitter is also configurable to sense a beacon signal 202 generated by the VCU 118 or wireless power receiver. Generally, the BCU 110 may also include a beacon detection mode (e.g., listening mode or idle mode) in which the primary resonant circuit or transmitter coil 114 is monitored for current generated responsive to, or indicative of, a beacon signal 202. In response to detecting the beacon signal 202, the BCU 110 may initiate a power transmission mode, reconfiguration of the primary resonant circuit, or other power transfer operations.

In this example, the primary resonant circuit of the BCU 110 includes a switch 204 that is capable of shorting the transmitter coil 114 and a current sensor 206 to monitor current in the coil. The switch may short across the transmitter coil, other tuning elements of the primary resonant circuit (e.g., a parallel capacitor), or a section of the primary resonant circuit that includes the coil. For example, the switch 204 may be connected between an inverter and a tuning portion of the primary resonant circuit, such as components of an inductor-capacitor-inductor (LCL) tank circuit or a capacitor-capacitor-inductor (CCL) tank circuit. Shorting the transmitter coil 114 (e.g., primary coil) or a portion of the primary resonant circuit may re-tune or reconfigure the transmitter coil 114 to receive the beacon signal 202. The current sensor 206 of the BCU 110 can be configured to sense current induced by a beacon signal in the transmitter coil 114 or other portions of the primary resonant circuit. Alternately or additionally, the current sensor 206 may sense current in the primary resonant circuit or components thereof in either shorted or non-shorted configurations.

The beacon signal 202 (or beacon field) is transmitted by the receiver coil 116 (e.g., power receiving coil) connected to the VCU 118 of the wireless power receiver. The secondary resonant circuit of the receiver coil 116 may include any suitable combination of components and in this example includes a parallel capacitor 208. In some cases, the receiver coil 116 and capacitor 208 form a parallel tuned vehicle pad that is capable of generating the beacon signal 202. Generally, the VCU 118 may be configurable or controllable to generate the beacon signal 202 and to receive power wirelessly transmitted by the BCU 110. In some aspects, the VCU 118 may seamlessly transition from generating the beacon signal 202 to receiving power from the BCU 110 without reconfiguration, synchronization, or operational state control.

To convert power received from the BCU 110, the VCU includes power conversion circuitry capable of converting the power to a form suitable for charging the battery 120 of the EV 106. In this example, rectifier circuitry 124 of the VCU 118 includes diodes 210 and 212, which may form a current-injection (e.g., secondary-side current injection) or current-doubling rectifier. The VCU 118 may also include boost circuitry 126 comprising individual or interleaved boost circuits connected to the secondary resonant circuit. A first boost circuit of the VCU 118 includes an inductor 214 connected to the receiver coil 116, a switch 216 connected between the inductor and a lower potential (e.g., ground), and a diode 218 connected between the inductor 214 and the battery 120. In some cases, the inductor 214 is connected downstream of a rectifier and therefore be embodied as a DC inductor (e.g., non-resonating), such as having low impedance at low or near-DC frequencies and higher impedance at higher frequencies (e.g., higher than 50 kHz). The switch 216 can control the flow of current through the inductor 214 or into the battery 120, and may be controlled by the VCU controller 130. The diode 218 is connected between the switch 216 and the battery 120 to control a direction of current into the battery rather than permitting current from the battery 120 to enter the boost circuitry.

Similarly, a second boost circuit of the VCU 118 includes another inductor 220 connected to the receiver coil 116, another switch 222 connected between the other inductor 220 and the lower potential, and another diode 224 connected between the other inductor and the battery 120. Although shown as symmetrical boost circuits or controllers, other non-symmetrical boost circuitry may be implemented as alternate configurations. As with the first boost circuit, the other inductor 220 may be connected downstream of the rectifier and therefore be embodied as a DC inductor having low impedance at low or near-DC frequencies and higher impedance at higher frequencies.

The other switch 222 can control the flow of current through the other inductor 220 or into the battery 120, and may also be controlled by the VCU controller 130. The switches 216 and 222 may be implemented with any suitable type or combination of switch components, such as bipolar-junction transistors (BJTs), isolated-gate bipolar transistors (IGBTs), reverse-blocking IGBTs (RB-IGBTs), metal-oxide-semiconductor field-effect transistors (MOSFETs), silicon carbide (SiC) MOSFETs, and the like. The other diode 218 is connected between the other switch 222 and the battery 120 to control a direction of the current into the battery rather than permitting current from the battery 120 to enter the boost circuitry. Alternately or additionally, the diodes 218 and 224 can implemented with any suitable types of diodes, such as silicon diodes, SiC diodes, Schottky diodes, insulated diodes, and the like.

Figure 3:
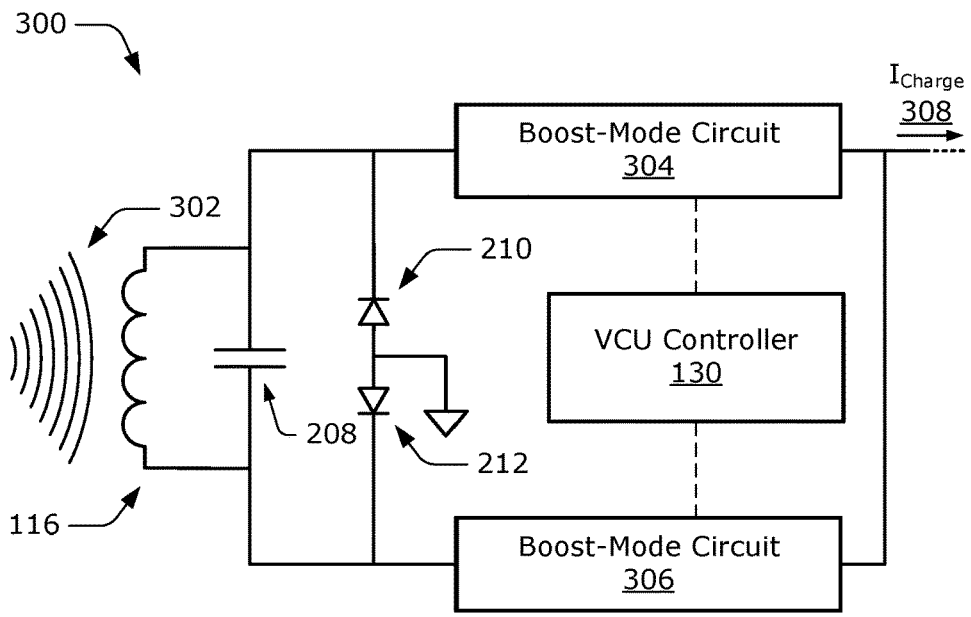
FIG. 3 illustrates example configurations of the beacon circuitry and boost circuitry in accordance with one or more aspects.
Figure 3:
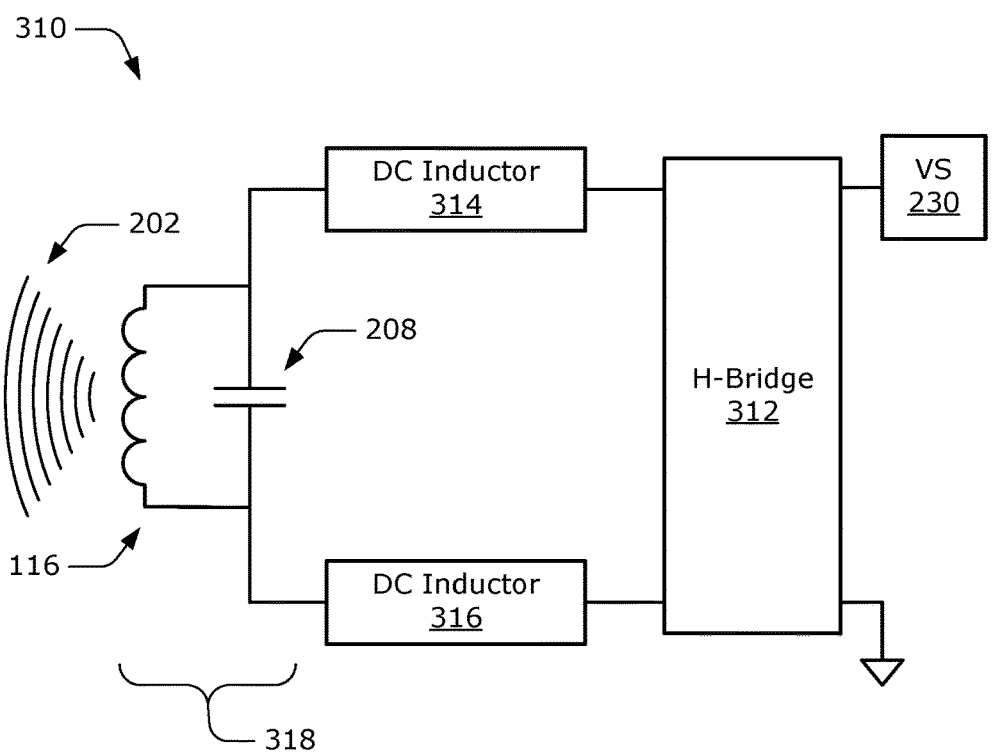

The VCU controller 130 can drive or control the switches 216 and 222 of the boost mode circuitry to convert the power received from the BCU 110 to any level of current or voltage, such as current and voltage suitable for charging the battery 120. By way of example, consider FIG. 3 in which a simplified configuration of the boost and rectifier circuitry is shown at 300. Here, a time-varying magnetic field 302 generated by the BCU 110 to transmit power is received via the receiver coil 116 (e.g., vehicle pad). The VCU controller 130 may detect current induced in the receiver coil 116 by the magnetic field 302 (current sensor not shown) and control the boost-mode circuits 304 and 306 to provide charging current 308 to the battery 120 of the EV 106.

Returning to FIG. 2, the VCU 118 also includes beacon circuitry capable of driving current into the receiver coil 116 to generate the beacon signal 202. In this example, the beacon circuitry includes switches 226 and 228 that are connected between a voltage source 230 (VS 230) and respective inductors of the boost circuitry. The switches 226 and 228 of the beacon circuitry may be implemented with any suitable type or polarity of switch, such as BJTs, IGBTs, RB-IGBTs, MOSFETs, SiC MOSFETs, and the like. In some cases, these switches 226 and 228 can be implemented as part of an H-bridge (e.g., high-side switches) that includes switches 216 and 222 of the boost circuitry (e.g., low-side switches). Thus, beacon circuitry switches 226 and 228 may be activated or driven with a corresponding boost circuitry switch 216 or 222 to drive current into the inductors 214 and 220 and the receiver coil 116. Alternately or additionally, the H-bridge of the VCU 118 may be operated as a boost circuit with an active output rectifier to provide current to the battery 120. In such cases, the switches 226 and 228 may be implemented with devices having similar size or ratings to those of switches 216 and 222 for conducting comparable amounts of current (e.g., a symmetric H-bridge).

In some aspects, the beacon circuitry includes steering diodes 232 and 234 connected between the voltage source 230 (e.g., high-voltage source) and the high-side switches 226 and 228 to prevent transferred power current from entering or back-feeding into the beacon circuitry. In other words, the switches 226 and 228 along with the diodes 232 and 234 may not conduct large amounts of current associated with the transfer, conversion, or storage of power from the BCU 110. As such, the switches 226 and 228 and diodes 232 and 234 can be implemented with lower-rated or smaller devices than those that conduct current of the transferred power, such as switches 216 and 222 and diodes 218 and 224. Accordingly, the beacon mode circuitry may be implemented as part of an asymmetric H-bridge in which the beacon circuitry is implemented with lower-rated and less expensive devices than those of the boost circuitry. By so doing, the vehicle-side beacon mode can be implemented with minimal increases in complexity or cost to the VCU 118 or wireless power receiver.

In addition to the diodes 232 and 234 that steer current of the boost circuitry through diodes 218 and 224, the VCU controller 130 may also be configured to prevent respective pairs of the switches 216, 226 and 222, 228 from shorting the voltage source 230. For example, the VCU controller 130 may ensure that the high-side switch 226 or 228 is off (e.g., open) when a corresponding boost switch 216 or 222 is active to prevent the voltage source 230 from shorting to ground. Operationally, the boost circuitry or controllers would be able to function in a normal boost or power conversion mode.

When implementing a beacon mode, the VCU controller can open a boost switch and turn on a high-side switch effective to pull a midpoint of the H-bridge up to a supply voltage. In some cases, the supply voltage is provided by the voltage source 230, which may be configured as a high-voltage low-current voltage source. In other cases, the battery 120 can be used to provide the supply voltage for the H-bridge in the beacon mode. As noted, if a high-side switch is turned on during or in power transfer mode, the steering diodes 232 and 234 will prevent current from flowing through the high-side switch back to the source of the supply voltage.

Generally, the H-bridge formed by portions of the beacon and boost circuitry can be used to apply AC voltage to the battery- or DC-side of the boost circuit inductors (e.g., DC inductors). By way of example, again consider FIG. 3 in which a simplified configuration of a vehicle pad and beacon circuitry is shown at 310. Here, an H-bridge 312 applies AC current to DC inductors 314 and 316 of the boost circuitry and into terminal of a vehicle pad 318 formed by the capacitor 208 and receiver coil 116. This AC current flowing in the receiver coil of the wireless power receiver then generates the beacon signal 202.

Although the DC inductors 314 and 316 may present high impedances at high frequencies, the VCU controller 130 may implement the beacon mode at or near a resonant frequency of the secondary resonant circuit (e.g., vehicle tuning network). This may be effective to enable a relatively small amount of the AC current to flow through the impedance of the inductors and cause the secondary resonant circuit to resonate. Further, the secondary resonant circuit may be configured with a high native Q factor such that the secondary resonant circuit can resonate up to a root mean square (RMS) voltage approaching an RMS voltage applied by the H-bridge. By so doing, significant vehicle pad current can be developed that is easily detectable by a base charging unit of the wireless charging system.

With respect to operation of the H-bridge, the VCU controller 130 can implement a duty-cycle of approximately 50 percent between upper and lower switches for each side of the H-bridge, with a relative phase of the two sides creating a variable AC waveform. In some cases, the VCU controller 130 can adjust the duty-cycle for each leg of the H-bridge outside of 50 percent. Alternately or additionally, a phase between the legs of the H-bridge may be adjusted or kept constant. By so doing, an amount of resonant current in the vehicle pad can be controlled while the VCU controller 130 is able to operate within an approximate range of operating conditions that permit the safe transfer of power. For example, controlling the resonant current can ensure that the secondary resonant circuit remains within a defined voltage range across a wide range of operating conditions.

Techniques of a Vehicle-Side Beacon Mode for WEVC

The following techniques of a vehicle-side beacon mode for WEVC may be implemented using any of the previously described elements of the example environment, components, or circuits. Reference to elements, such as the BCU 110, VCU 118, boost circuitry 126, beacon circuitry 128, or VCU controller 130, is made by example only and is not intended to limit the ways in which the techniques can be implemented. The techniques described herein may be implemented in static wireless charging systems or dynamic charging systems in which an electric vehicle or other power receiver moves during at least a portion of the power transfer process.

The techniques are described with reference to example methods illustrated in FIGS. 4, 5, 7, 8, 10, and 11 which are depicted as respective sets of operations or acts that may be performed by entities described herein. The operations described herein may be performed using any suitable circuitry or component, which may provide means for implementing one or more of the operations. The depicted sets of operations illustrate a few of the many ways in which the techniques may be implemented. As such, operations of a method may be repeated, combined, separated, omitted, performed in alternate orders, performed concurrently, or used in conjunction with another method or operations thereof.

Figure 4:
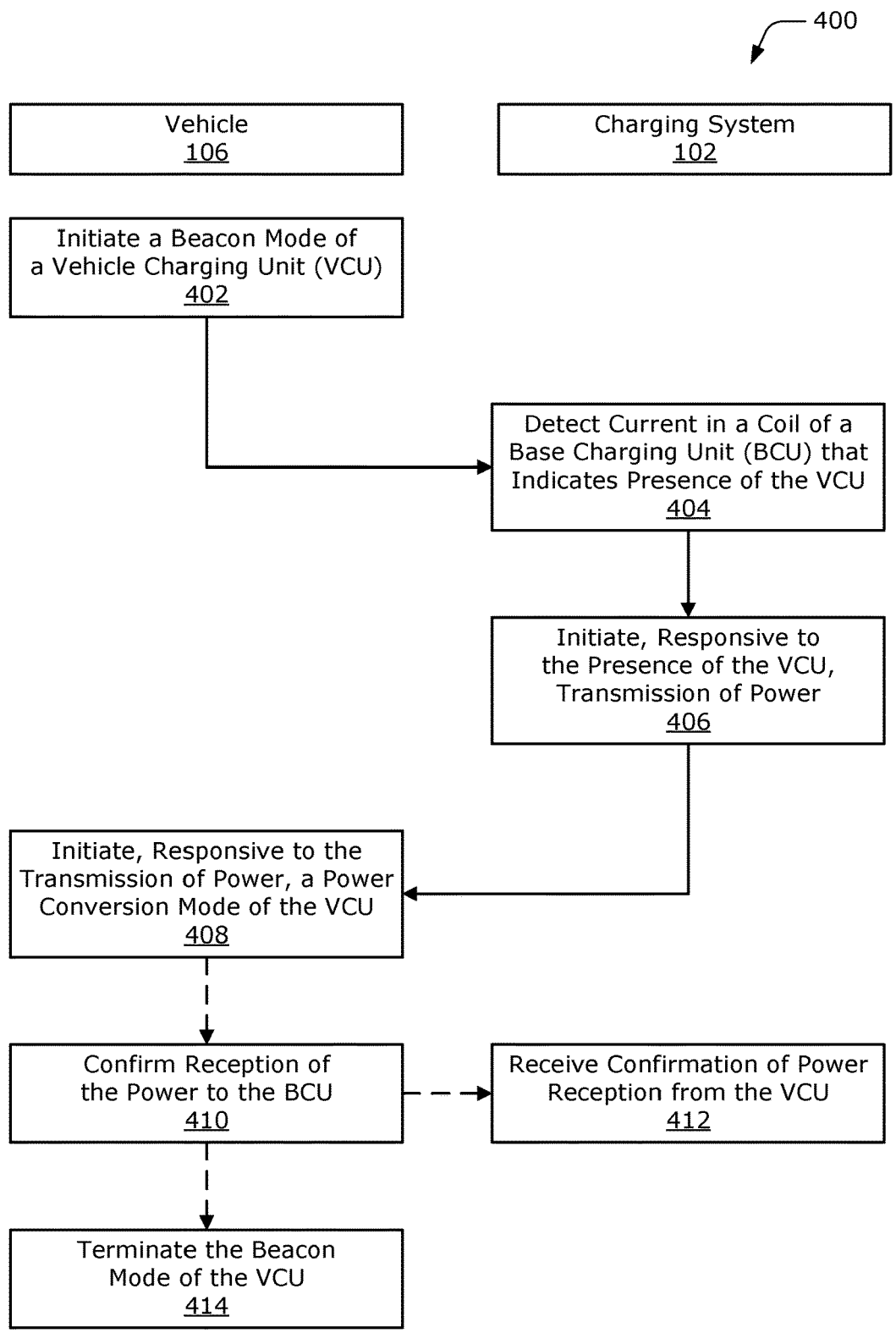
FIG. 4 illustrates an example method for initiating power transmission in a WEVC system with a vehicle-side beacon signal.

FIG. 4 illustrates an example method 400 for initiating power transmission in a WEVC system with a vehicle-side beacon signal. Operations of the method 400 may be performed by any suitable entity, such as a VCU controller 130 of an electric vehicle 106 or a BCU 110 of a wireless charging system 100.

At 402, a beacon mode of a vehicle charging unit is initiated. The beacon mode can be initiated or engaged based on user interaction, geolocation information, global positioning system information, an RF beacon, and the like. In some cases, the beacon mode is always on or activated periodically to broadcast the presence of the vehicle charging unit or electric vehicle. The beacon mode may be implemented by driving AC current into a coil or vehicle pad connected to the vehicle charging unit.

By way of example, consider FIG. 1 in which the electric vehicle 106 is travelling over the charging surface 112. Here, assume that a GPS module of the electric vehicle provide location information that indicates the electric vehicle 106 is travelling over the charging surface 112 of a dynamic charging system. In response to determining that a charging surface 112 may be available, the VCU controller 130 of the electric vehicle 106 enters a beacon mode in which a beacon signal is generated by the receiver coil 116.

At 404, current is detected in a coil of a base charging unit. The coil of the base charging unit by which the current is detected may be shorted or configured for power transmission. In some cases, the current is detected in response to a vehicle in beacon mode approaching the coil of the base charging unit. In other cases, the current is detected in response to a vehicle proximate the coil activating a beacon mode. In the context of the present example, as the electric vehicle 106 approaches a BCU 110 of the charging surface 112, the beacon signal generated by the receiver coil 116 induces current flow in the transmitter coil 114 of the BCU 110. The BCU 110 detects this current flow via a current sensor and determines that the vehicle charging unit 118 of the electric vehicle is present.

At 406, transmission of power is initiated responsive to the presence of the vehicle charging unit. Prior to the transmission of power, the base charging unit or transmitter coil may be reconfigured for power transfer. For example, a coil shorted to facilitate detection of the beacon signal may be opened, un-shorted, or restored to a power transfer configuration. In some cases, the base charging unit determines whether particular requirements, such as basic alignment, are met before initiating the transmission of power. The base charging unit can implement the transmission of power by driving current into a base pad or transmission coil.

Continuing the ongoing example, a controller of the BCU 110 opens a short of the transmitter coil 114 and engages a power transmission mode of the BCU 110 in which current is driven into the transmitter coil 114 to generate a time-varying magnetic field for inductive power transfer. Here, note that the transmission of power can be initiated quickly without out-of-band communication, handshaking between the BCU 110 and VCU 118, or reconfiguration of either device. Thus, the transfer of power can be initiated in a matter of milliseconds (e.g., three to ten milliseconds), which can be critical in dynamic charging systems where an electric vehicle is present over the base charging unit for a short period of time.

At 408, a power conversion mode of the vehicle charging unit is initiated. The power conversion mode may be initiated responsive to detecting that power is being received from the base charging unit. In some cases, this includes detecting additional or other current in the receiver coil of the vehicle charging unit indicative of power being received. The power conversion mode may include rectification and conditioning the received power. For example, boost circuitry of the vehicle charging unit may control conversion of the power for specific output current or voltage suitable for charging a battery of the electric vehicle.

In the context of the present example, the VCU controller 130 detects current in the receiver coil 116 indicating the reception of power from the BCU 110. Responsive to this, the VCU controller 130 engages a power conversion mode in which the boost circuitry 126 regulates the transferred power to a voltage and current suitable for charging the battery 120 of the electric vehicle 106. Here, note that the beacon circuitry can be implemented and operated to permit co-existence with a low-impedance power transfer path that includes the boost circuitry. Thus, the transition from the beacon mode to the power conversion mode may be seamless and require no reconfiguration of the vehicle charging unit.

Optionally at 410, reception of the power is confirmed to the base charging unit. The confirmation may be transmitted to the base charging unit via any suitable type of communication link, such as a wireless communication link or encoded into the beacon signal. In some cases, the confirmation is transmitted with other information useful to facilitate the transfer of power, such as receiver coil configuration information, receiver coil power rating, vehicle alignment or positioning information, charging status, fault states, a status of the battery, and the like. Continuing the ongoing example, the VCU controller 130 of the electric vehicle transmits, via a wireless communication link, confirmation of power reception and other charging parameters to the BCU 110 of the wireless charging system 100.

Optionally at 412, confirmation of power reception is received from the vehicle charging unit. The confirmation may be received via any suitable type of communication link, such as a wireless communication link or encoded into the beacon signal. In some cases, the confirmation is received from the vehicle charging unit with other information, such as coil configuration information, receiver coil power rating, vehicle alignment or position information, charging status, battery status, and the like. In the context of the present example the BCU 110 receives the confirmation that the VCU 118 is receiving the transmitted power and other charging parameters from the VCU controller 130.

Optionally at 414, the beacon mode of the vehicle charging unit is terminated. Although some implementations of beacon circuitry and a beacon mode may co-exist with ongoing power transfer operations, the beacon mode may also be terminated once the vehicle charging unit begins receiving power. Because of this permitted co-existence, however, the transition from beacon mode to power transfer mode can be seamless as synchronization, reconfiguration, or state control of the respective devices is unnecessary in most cases. Concluding the ongoing example, the VCU controller 130 terminates the beacon mode and continues to regulate power in the power conversion mode to charge the battery 120 of the electric vehicle.

Figure 5:
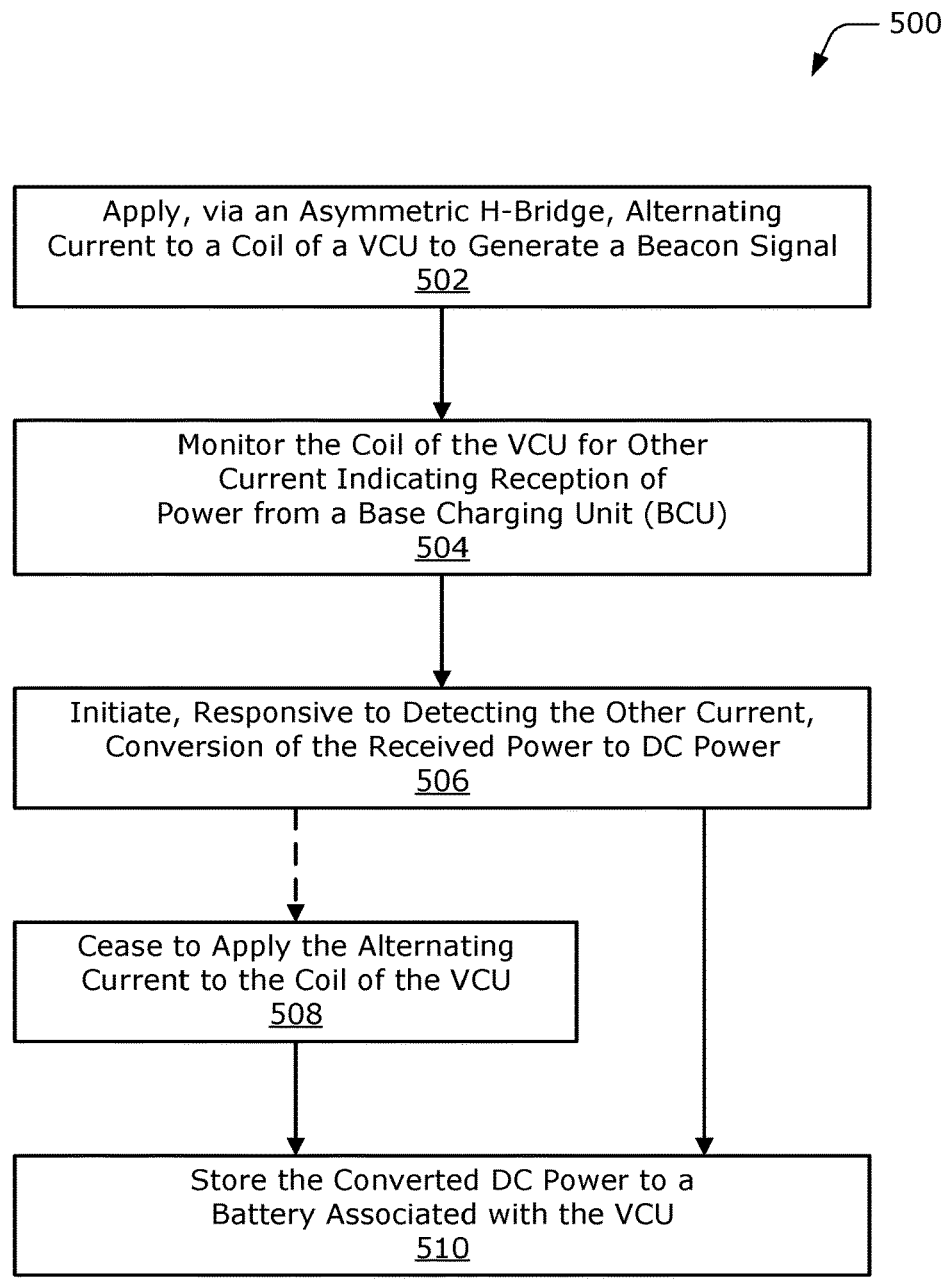
FIG. 5 illustrates an example method for implementing a beacon mode with a vehicle charging unit that includes beacon circuitry.

FIG. 5 illustrates an example method 500 for implementing a beacon mode with a vehicle charging unit that includes beacon circuitry, including operations performed by the VCU controller 130.

At 502, alternating current is applied to a coil of a vehicle charging unit. The alternating current may be applied via an H-bridge or asymmetric H-bridge powered by an internal voltage source or battery of an electric vehicle. In some cases, the alternating current is applied within a particular frequency range, such as from approximately 75 kHz to 125 kHz or from approximately 81.3 kHz to 90 kHz. Alternately or additionally, the alternating current may be applied in accordance with other frequency bands specified by power transfer emission standards or regulations.

Figure 6:
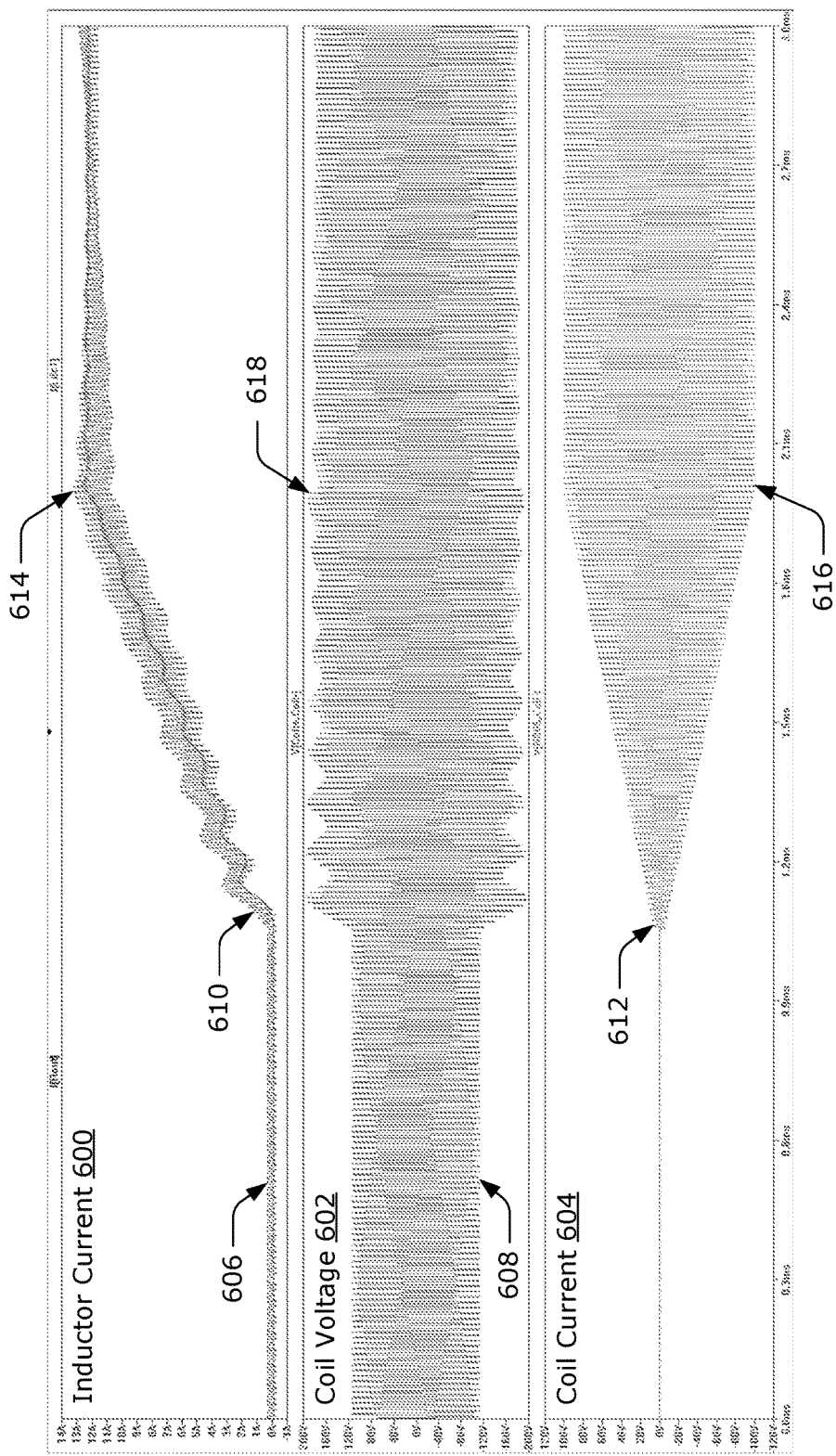
FIG. 6 illustrates example current and voltage waveforms associated with transitioning from a beacon mode to a power conversion mode.

By way of example, consider FIG. 6 which includes waveforms of inductor current 600, coil voltage 602, and coil current 606 during a transition from a beacon mode to a power conversion mode. Here, the vehicle charging unit is in a beacon mode from zero (start of time axis) to approximately one microsecond. While the beacon mode is active, a small amount of coil current 606 (e.g., AC current) is applied to a coil via inductors of a vehicle charging unit to generate the beacon signal. This AC current can be applied by an asymmetric H-bridge or other beacon circuitry of the vehicle charging unit. Here, note that the AC current is applied at or near a resonant frequency of the coil, which enables a relatively small amount of the AC current 606 (e.g., through the inductors) to generate significant coil voltage 608 to provide the beacon signal.

At 504, the coil of the vehicle charging unit is monitored for other current indicating reception of power from a base charging unit. The other current may be alternating current induced by a time-varying magnetic field of a transmitter coil of a base charging unit. Alternately or additionally, a tuning network of the coil, vehicle pad circuit, or rectification circuitry can be monitored for current or voltage indicating the reception of power.

Returning to FIG. 6, current in the transmitter coil begins to ramp up from approximately one millisecond to two milliseconds, which causes a corresponding increase in an amount of inductor current at 610. A VCU controller can detect this increased amount of inductor current 610 and determine that a BCU has begun transmitting power. Additionally, as shown at 612, an amount of current in the coil begins to increase as a transfer of power is initiated.

At 506, conversion of the received power is initiated in response to detecting the other current. This may include activating a power conversion or power boost mode to control components of boost circuitry to regulate the transferred power. In some cases, the power is regulated to a specific voltage or current that is suitable for charging a battery of the electric vehicle. Alternately or additionally, the converted power may be distributed to other electric systems of the electric vehicle.

In the context of FIG. 6, at approximately two milliseconds the inductor current 614, coil current 616, and coil voltage 618 complete ramping up to respective nominal levels. The VCU controller can seamlessly transition to a power conversion mode during or after this ramping of transferred power. From approximately three milliseconds on, the VCU receives power in a stable fashion, without having to take action to control or reconfigure the beacon mode or circuitry. As such, the VCU can begin controlling the boost circuitry to provide regulated power almost immediately after sensing coil current generated by the BCU.

Optionally at 508, application of the alternating current to the coil of the vehicle charging unit is ceased. This can be effective to cease to generate the vehicle-side beacon signal once the transfer of power is established. As noted this operation is optional because the beacon circuitry and beacon mode can be implemented or maintained while the boost circuitry regulates the power received from the base charging unit.

At 510, the converted DC power is stored to a battery associated with the vehicle charging unit. The converted DC power may be stored directly to the batteries or further conditioned to reduce ripple current or transient noise spikes. For example, output circuitry of the vehicle charging unit may include additional inductor or capacitors to condition the DC power prior to application to the battery of the electric vehicle.

Figure 7:
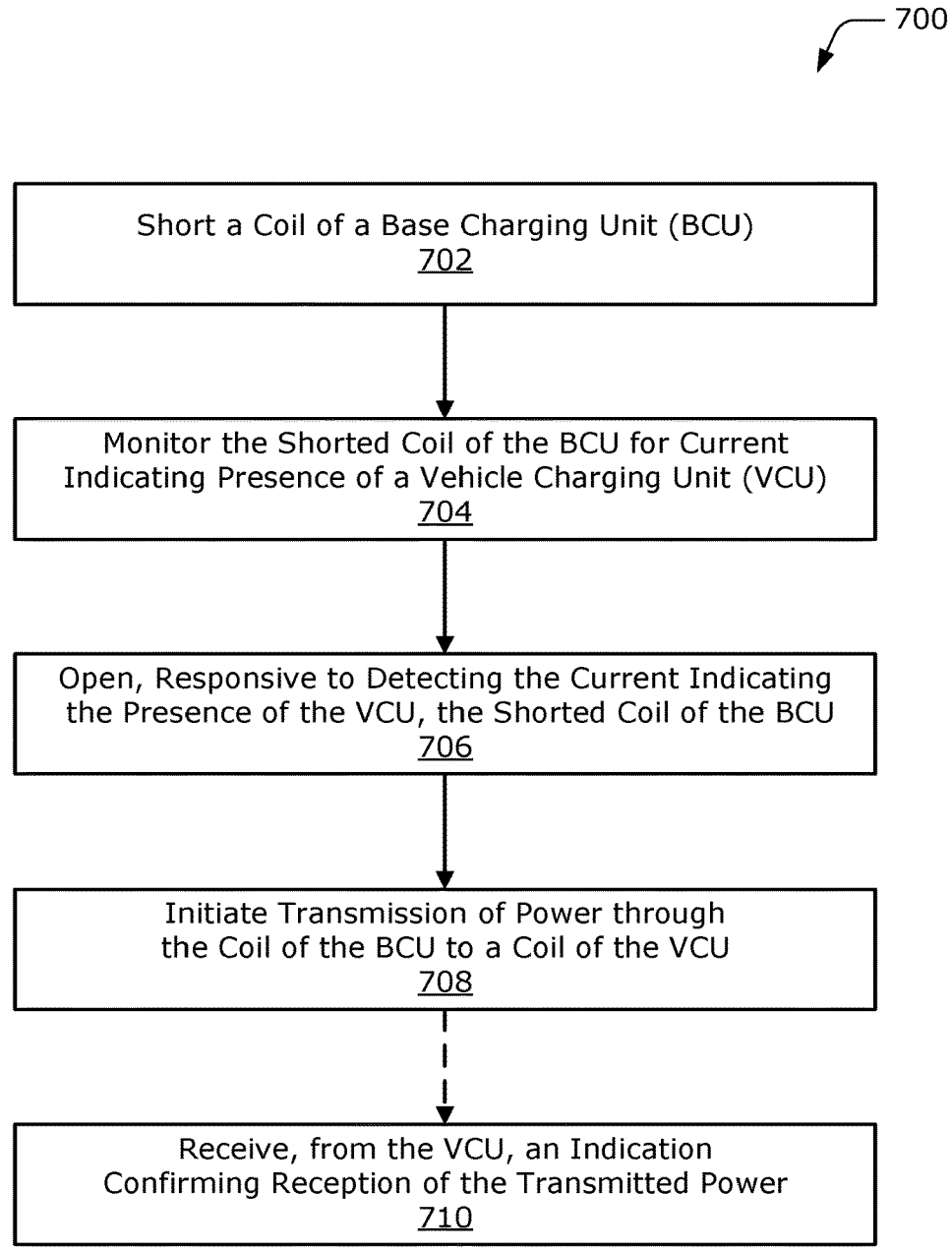
FIG. 7 illustrates an example method for detecting a vehicle-side beacon signal via a coil of base charging unit.

FIG. 7 illustrates an example method 700 for detecting a vehicle-side beacon signal via a coil of base charging unit, including operations performed by the base charging unit.

At 702, a coil of a base charging unit is shorted. The coil may be shorted directly or a tuning circuit of the coil may be shorted at another location. For example, the tuning circuit or base pad can be shorted between connections to an inverter of the base charging unit. Alternately, in some configurations of the base pad, the coil of the base charging unit may be left un-shorted or configured for power transfer.

At 704, the shorted base coil of the base charging unit is monitored for current. The current may indicate presence of a vehicle charging unit, such as a vehicle charging unit generating a beacon signal. In some cases, the current is monitored via a sensor coupled or connected to the coil of the base charging unit. In other cases, a current sensor may be connected to or coupled with tuning circuitry of the coil, such as a copper trace, power cable, or inductor.

At 706, the shorted coil of the base charging unit is opened responsive to detecting the current indicating the presence of a vehicle charging unit. The detected current may be induced in the shorted coil by a beacon signal generated by the vehicle charging unit. In some cases, opening the shorted coil of the base charging unit reconfigures the coil for transmission of power to a receiver coil of the vehicle charging unit.

At 708, transmission of power through the coil of the base charging unit to a coil of the vehicle charging unit is initiated. Prior to transmission of the power, the base charging unit may verify alignment with a coil of the base charging unit, such as by amplitude or strength of a vehicle-side beacon signal. In some cases, the transmission of power is initiated or ramped up responsive to detecting the beacon signal of the vehicle charging unit. Alternately or additionally, parameters of power transmission may be adjusted based on feedback provided by the vehicle charging unit, such as a coil rating or coil configuration of the receiver coil or vehicle pad.

Optionally at 710, an indication confirming reception of the transmitted power is received from the vehicle charging unit. The confirmation may be received via any suitable type of communication link, such as a wireless communication link or encoded into the beacon signal. In some cases, the confirmation is received from the vehicle charging unit with other information, such as coil configuration information, receiver coil power rating, vehicle alignment or position information, charging status, battery status, and the like.

Figure 8:
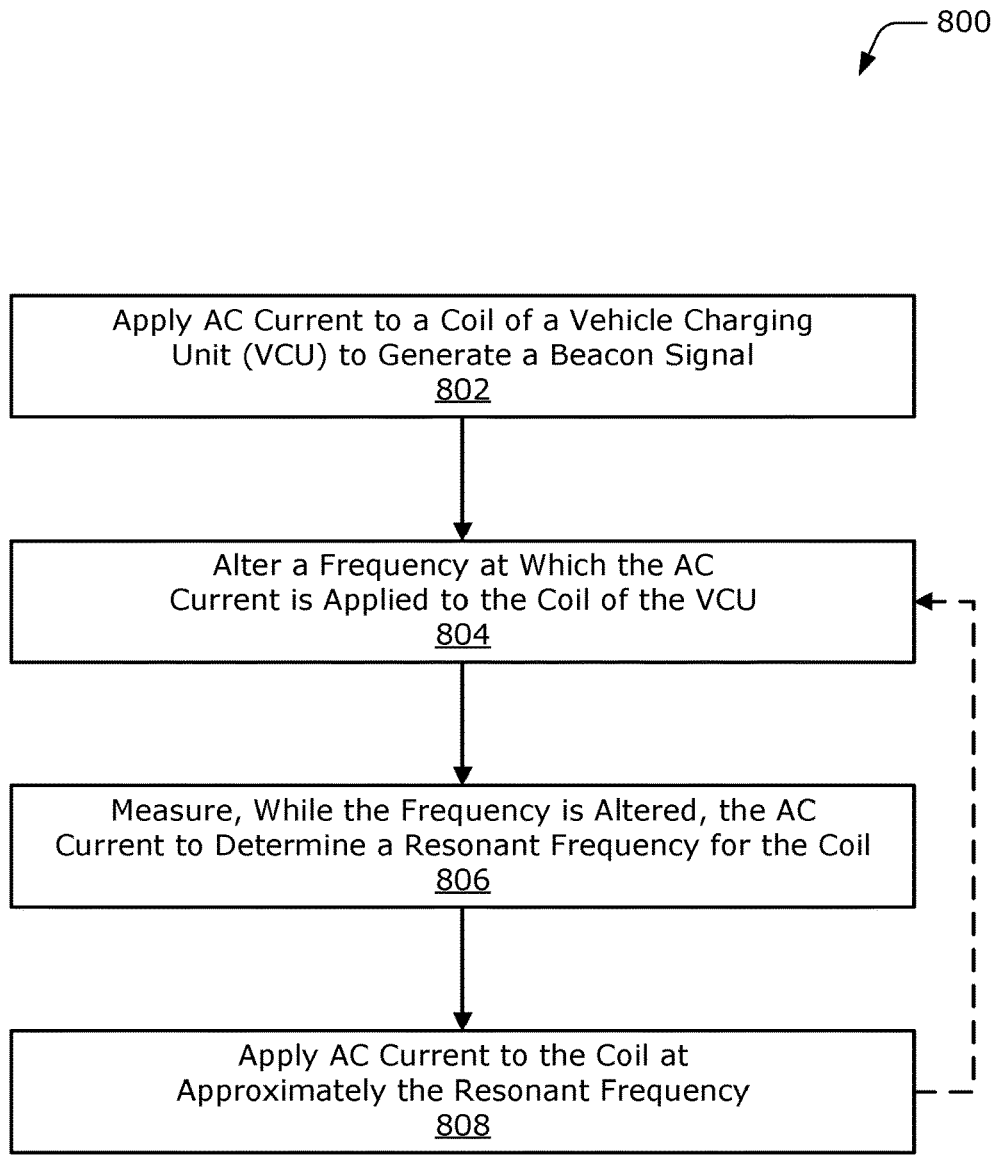
FIG. 8 illustrates an example method for determining a resonant frequency of a vehicle-side coil.

FIG. 8 illustrates an example 800 method for determining a resonant frequency of a vehicle-side coil, including operations performed by the VCU controller 130. Due to the variable nature of wireless charging systems, particularly dynamic systems, tuning between respective coils of the base and vehicle charging units may vary. In some cases, these tuning variations affect beacon current or signal strength, which can make detection of the beacon signal more difficult. As such, being able to dynamically determine a resonant frequency of the vehicle pad under different tuning conditions and adaptively set a frequency of the beacon signal for optimal performance can improve detectability of the vehicle-side beacon signal.

At 802, AC current is applied to a coil of a vehicle charging unit to generate a beacon signal. The AC current may be applied via an H-bridge or asymmetric H-bridge connected to a voltage source or battery of an electric vehicle. In some cases, the AC current is applied at a frequency to generate the beacon signal within a regulatory frequency range for wireless power transmission, such as from approximately 81.3 kHz to 90 kHz. Alternately or additionally, the beacon signal may be generated at or near a resonant frequency of the coil of the vehicle charging unit.

At 804, a frequency at which the AC current is applied to the coil of the vehicle charging unit is altered. The frequency may be altered or swept across a predefined frequency range. In some cases, the frequency range through which the frequency is swept is defined or configured to include a resonant frequency of the coil of the vehicle charging unit or vehicle pad. Alternately or additionally, the frequency range can be set wide enough to include or encompass all possible resonant points for a given combination of the coil and tuning circuitry. The frequency alteration or change rate may be set such that the vehicle charging unit or base charging unit can detect a peak in current or beacon signal amplitude. For example, the frequency change rate can be set based on a sample rate and filter characteristics of the base charging unit to ensure detectability of the vehicle during the peak of current.

At 806, the AC current is measured while the frequency is altered. From the perspective of the vehicle charging unit, the current may be measured while the operational frequency of the beacon mode is swept across the frequency range. In some cases, the vehicle charging unit measures the current based on current draw of the beacon circuitry, vehicle pad current, coil current, and the like. Alternately or additionally, an amplitude or strength of the beacon signal can be monitored based on vehicle pad or receiver coil voltage.

In some aspects, the AC current may peak when the frequency of the beacon signal is swept through a resonant frequency of the coil or vehicle pad. By way of example, consider FIG. 9 which illustrates a current versus time plot 900 during a sweep from 82 kHz to 87 kHz. Here, a peak in the AC current occurs at approximately 58 milliseconds into the sweep of beacon mode operational frequency. Based on this information, the vehicle charging unit can correlate an operational frequency to the sweep timing to determine a resonant frequency for the vehicle pad or receiver coil (e.g., ~84.9 kHz).

Figure 9:
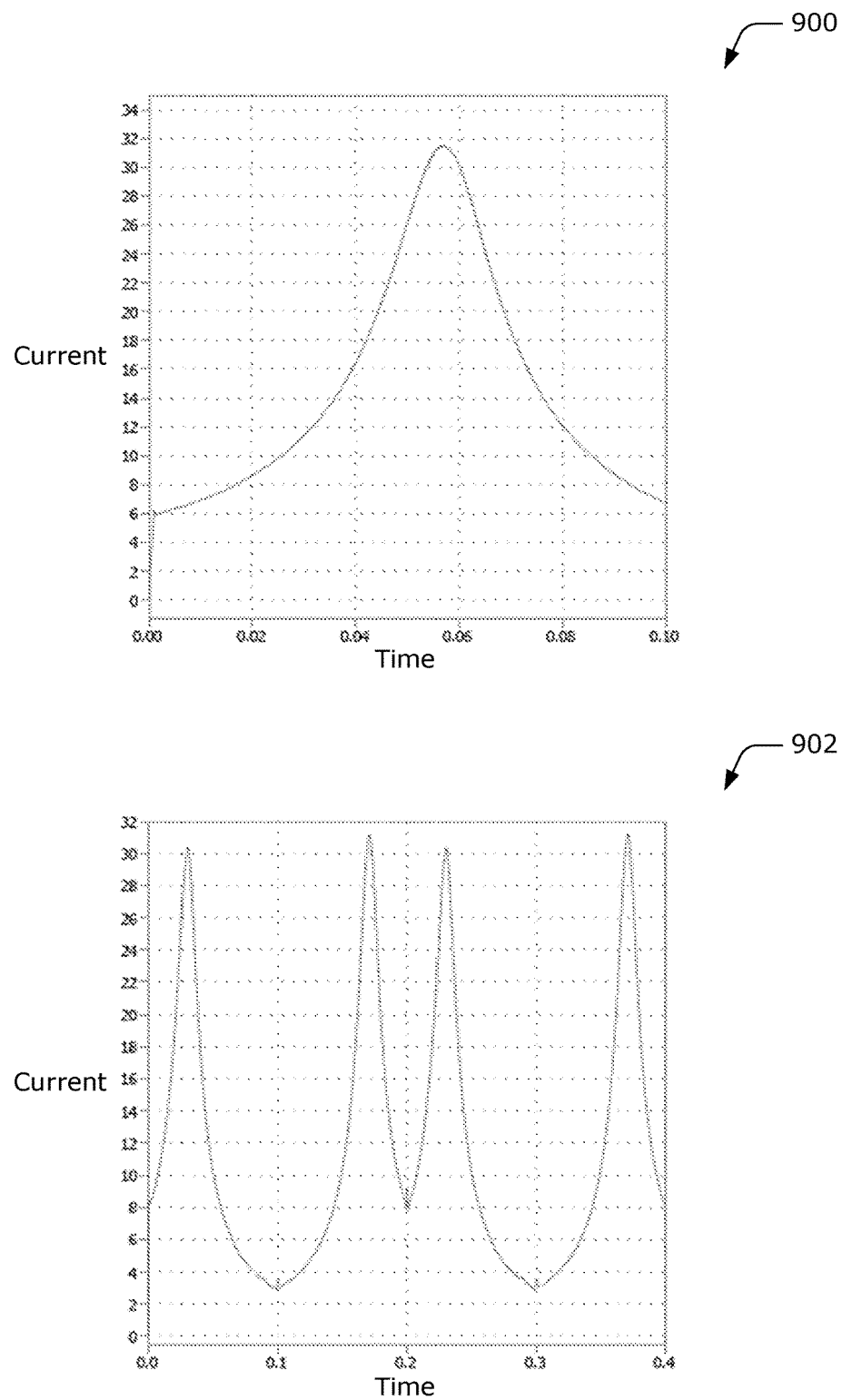
FIG. 9 illustrates example current waveforms associated with sweeping a frequency of a beacon signal to determine a resonant frequency.

As another example, consider another current versus time plot 902 of FIG. 9 in which the operational frequency is swept from 83 kHz to 87 kHz and back, twice (e.g., 100 millisecond sweep intervals). Here, the vehicle charging unit can determine, based on the current in the vehicle pad, a possible resonant frequency at approximately 85.2 kHz as the frequency range is swept multiple times. Alternately or additionally, the frequency at which peak current amplitude occurs may also be useful to determine the presence of any ferrite or coils under the electric vehicle, which indicate that a charging system is available. Further, when used over a continuous system of charging pads, a measure of alignment can be determined based on the amplitude current.

At 808, the AC current is applied to the coil at approximately the resonant frequency increase or maintain an amplitude of the beacon signal. In some cases, keeping the beacon signal at or above the resonant frequency of the vehicle pad or receiver coil is effective to maximize an amplitude of the beacon signal. By so doing, an amplitude of the beacon signal can be maintained over various tuning conditions thereby enabling detection by a base charging station. Optionally, from operation 808, the method 800 may return to operation 804 to continue sweeping the operational frequency of the beacon signal. From this, an updated resonant frequency (e.g., resonant point) may be determined by the vehicle charging unit. In such cases, the updated resonance information can be useful to confirm presence of a base pad, update resonant points of the coil, or provide additional alignment information.

Figure 10:
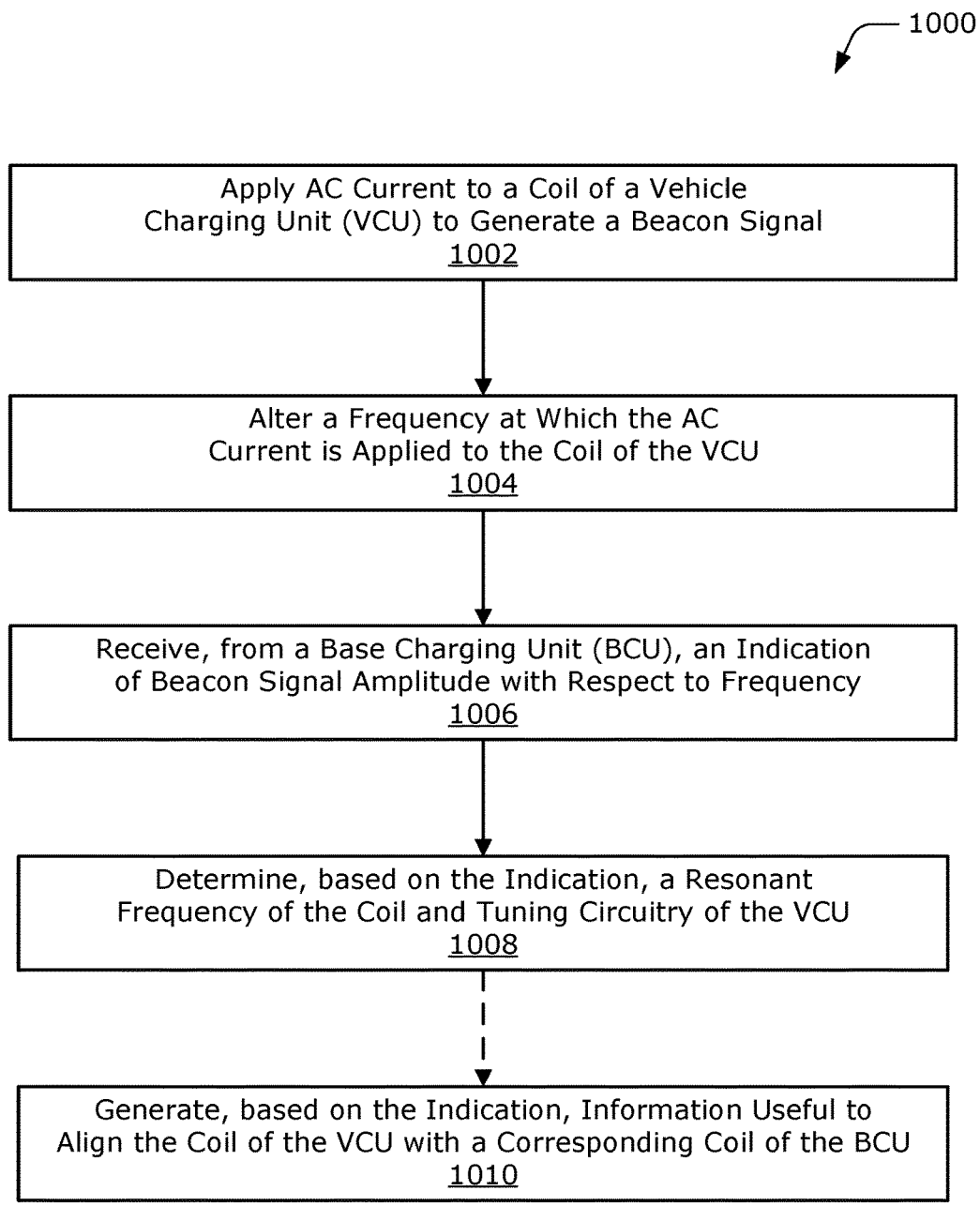
FIG. 10 illustrates an example method for determining a resonant frequency of a coil based on feedback provided by a base charging unit.

FIG. 10 illustrates an example method 1000 for determining a resonant frequency of a vehicle-side coil based on feedback provided by a base charging unit, including operations performed by the VCU controller 130 or the BCU 110.

At 1002, AC current is applied to a coil of a vehicle charging unit to generate a beacon signal. The AC current may be applied via an H-bridge or asymmetric H-bridge connected to a voltage source or battery of an electric vehicle. In some cases, the AC current is applied at a frequency to generate the beacon signal within a regulatory frequency range for wireless power transmission, such as from approximately 81.3 kHz to 90 kHz. Alternately or additionally, the beacon signal may be generated at or near a resonant frequency of the coil of the vehicle charging unit.

At 1004, a frequency at which the AC current is applied to the coil of the vehicle charging unit is altered. The frequency may be altered or swept across a predefined frequency range. In some cases, the frequency range through which the frequency is swept is defined or configured to include a resonant frequency of the coil of the vehicle charging unit or vehicle pad. Additionally, a frequency range may also be set wide enough to include or encompass all possible resonant points for a given combination of the coil and tuning circuitry. The frequency alteration or change rate may be set such that the vehicle charging unit or base charging unit can detect a peak in current or beacon signal amplitude. For example, the frequency change rate can be set based on a sample rate and filter characteristics of the base charging unit to ensure detectability of the vehicle during the peak of current.

At 1006, an indication of beacon signal amplitude is received from a base charging unit. The indication may include frequency information associated with the amplitude or a frequency at which a peak signal amplitude occurs. In some cases, a series of indications are received that indicate beacon signal amplitude with respect to frequency or time. From the perspective of the base charging unit, an amplitude of current received in a base pad or coil will vary up and down as the frequency of the beacon signal is swept. A peak detector may be implemented in the base charging unit with a decay rate set based on a speed of the vehicle or frequency of the sweep. By so doing, the base charging unit can detect an amplitude or peak in the base pad current at various frequencies. Any or all of these indications of beacon signal amplitude can be transmitted to the vehicle charging unit.

At 1008, a resonant frequency of the coil and tuning circuitry of the vehicle charging unit is determined based on the indication. The indication may specify an approximate frequency at which a peak in beacon signal amplitude was observed. This approximate frequency may be used as a resonant point or resonant frequency for the coil of the vehicle charging unit. In other cases, the resonant frequency may be determined based on the beacon signal strength, frequency, or time indicated by the indication. For example, the resonant frequency may be determined based on a series of indications for beacon signal amplitude with respect to frequency.

Optionally at 1010, information useful to align the coil of the vehicle charging unit is generated based on the indication received from the base charging unit. The vehicle charging unit may continuously sweep the operational frequency of the beacon signal to generate additional or supplemental alignment information. In such cases, the vehicle charging unit may receive updated indications of beacon signal strength over time. From these updated indications, an updated resonant frequency (e.g., resonant point) may be determined by the vehicle charging unit. This updated resonance information can be useful to confirm presence of a base pad, update resonant points of the coil, or provide additional alignment information.

Figure 11:
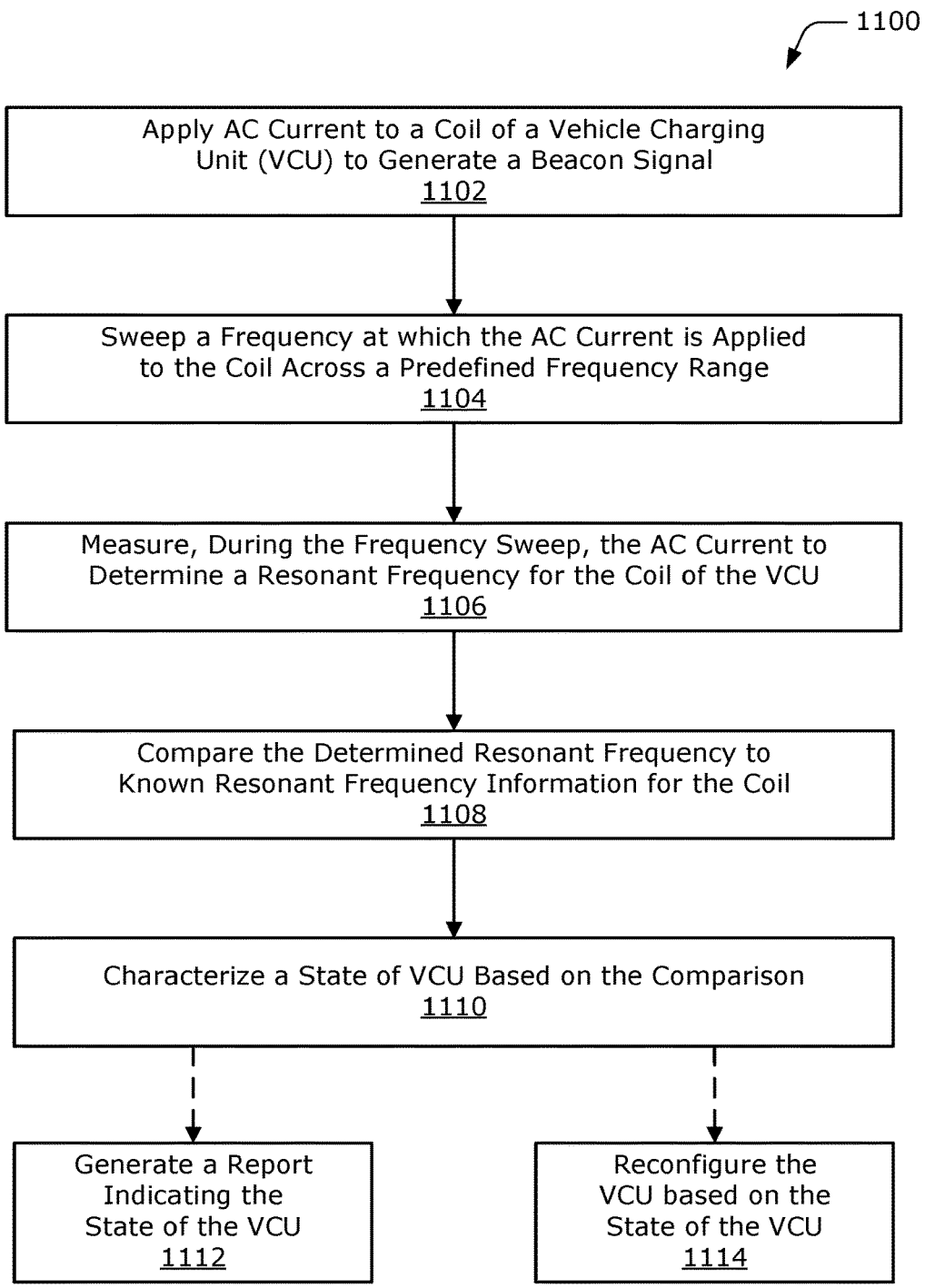
FIG. 11 illustrates an example method for characterizing a state of a vehicle charging unit based on resonant frequency.

FIG. 11 illustrates an example method 1100 for characterizing a state of a vehicle charging unit based on resonant frequency, including operations performed by a controller of the vehicle charging unit.

At 1102, AC current is applied to a coil of a vehicle charging unit to generate a beacon signal. The AC current may be applied via an H-bridge or asymmetric H-bridge connected to a voltage source or battery of an electric vehicle. To comply with safety or emission standards, the AC current can be applied at a frequency to generate the beacon signal within a regulatory frequency range for wireless power transmission, such as from approximately 81.3 kHz to 90 kHz. Alternately, the beacon signal may be generated within a wider range of frequencies, such as from approximately 75 kHz to 125 kHz.

At 1104, a frequency at which the AC current is applied to the coil is swept across a predefined frequency range. The predefined frequency range may include or be broken into sub-ranges, such as sub-ranges of approximately 3 kHz to 5 kHz. In some cases, the frequency range through which the frequency is swept is defined or configured to include at least one resonant frequency of the coil of the vehicle charging unit or vehicle pad. The predefined frequency range may also be set wide enough to include or encompass all possible resonant points for a given combination of the coil and tuning circuitry.

At 1106, the AC current is measured during the frequency sweep to determine a resonant frequency for the coil of the vehicle charging unit. The vehicle charging unit can measure the current based on current draw of the beacon circuitry, vehicle pad current, coil current, and the like. Alternately or additionally, an amplitude or strength of the beacon signal can be monitored based on vehicle pad or receiver coil voltage. From these current measurements, the vehicle charging unit can determine a resonant frequency or resonant point for the coil based on peaks or amplitude of the AC current.

At 1108, the determined resonant frequency is compared with known resonant frequency information for the coil of the vehicle charging unit. By so doing, tuning of the vehicle-side resonant circuit can be measured or monitored over time. For example, a resonant circuit or system may de-tune due to various factors, such as component tolerances, faults, stress, or aging. This measurement of the system may also be performed as a standalone test when the vehicle charging unit is verified to be over a base charging unit. In other cases, a series of longer term measurements are performed over different base pads to remove or eliminate effects unique to individual base pads. To account for effects introduced by different base pads or base pad configurations, the resonant frequency can be compared with an acceptable range of known or predetermined values.

Alternately or additionally, current drawn by the beacon circuitry to maintain operation at resonance can be useful to measure of tuning of the vehicle system, vehicle system Q-factor, or total system Q-factor. For example, peak and trough vehicle pad current and peak and trough DC input current can be monitored an compared against each other and frequency to measure or quantify tuning of the vehicle-side resonant system.

At 1110, a state of the vehicle charging unit is characterized based on the comparison of the resonant frequency and the known information. Generally, the state of the vehicle charging unit may be characterized with any suitable type of performance or operation metrics. For example, the state of the vehicle charging unit can be characterized as tuned and operating within an acceptable range of parameters for coil tuning, power transfer efficiency, beacon signal strength, and the like. Alternately, the state of the vehicle charging unit can also be characterized as un-tuned, tuning further deteriorating due to component stress or age, and in need of system maintenance. A vehicle charging unit controller may also characterize states of individual system components, such as the receiver coil, tuning circuitry, boost circuitry, beacon circuitry, battery, may also be determined.

Optionally at 1112, a report indicating the state of the vehicle charging unit is generated. After characterizing a state of the vehicle charging unit, tuning network, or receiver coil, the vehicle charging unit controller can generate a report indicative of the state of the vehicle charging unit or battery of the vehicle. This report can then be transmitted to a control system of the vehicle, a manufacturer of the vehicle, a user of the vehicle, and the like.

Optionally at 1114, the vehicle charging unit is reconfigured based on the state of the vehicle charging unit. The reconfiguring or re-tuning the vehicle charging unit may improve power transfer or beacon mode operations. For example, an operational frequency of the beacon signal may be increased to ensure that the beacon signal is generated at or above a resonant frequency of the coil or resonant circuit of the vehicle charging unit. For a vehicle charging unit with a tunable resonant circuit, the tunable resonant circuit can be reconfigured to shift the resonant frequency to another frequency to enable optimal power transfer.

Charge Control System

Figure 12:
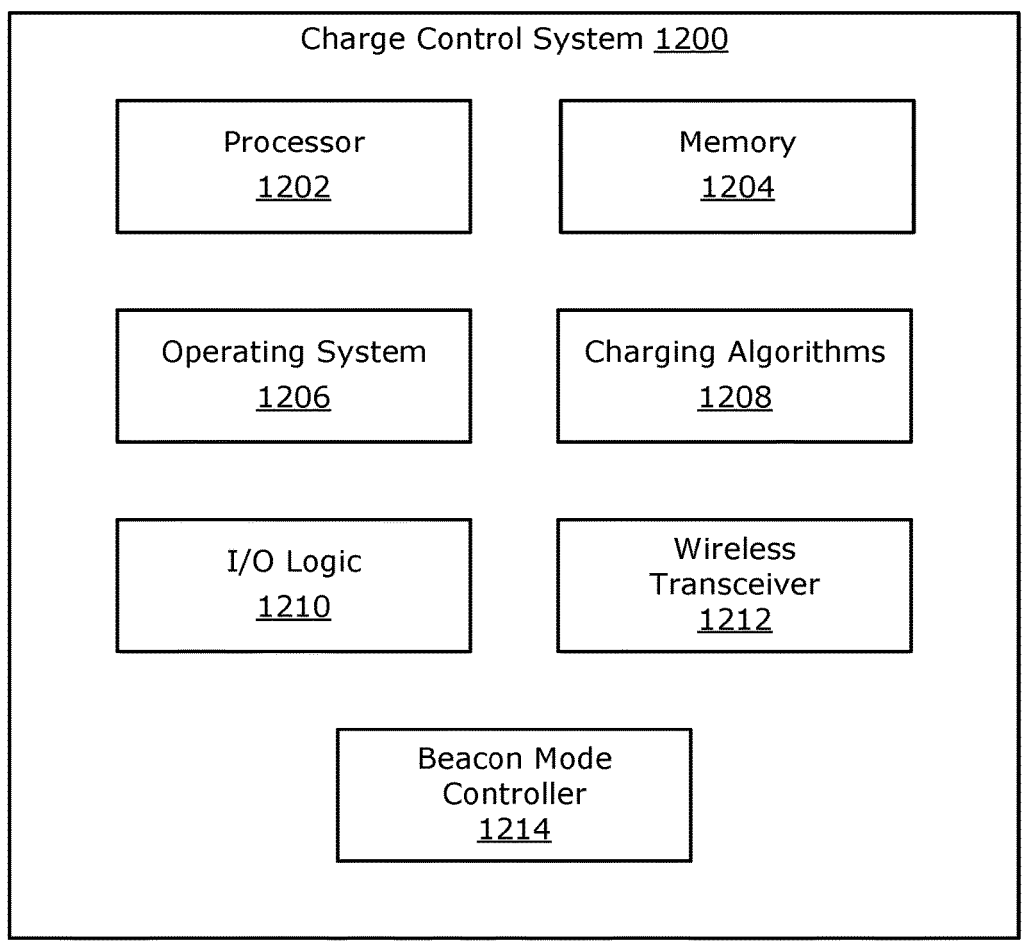
FIG. 12 illustrates an example charge control system in accordance with one or more aspects.

FIG. 12 illustrates an example charge control system 1200, which includes components capable of implementing aspects of a vehicle-side beacon mode for WEVC. Entities of the charge control system 1200 may be implemented combined or separately in any suitable structure, such as a system-on-chip (SoC), application specific integrated-circuit (ASIC), power management IC (PMIC), printed circuit board assembly (PCBA), embedded system, and the like. The charge control system 1200 may also be implemented as, or in, any suitable wireless power-receiving device or power transfer device, such as a WEVC system, dynamic electric vehicle charging (DEVC) system, vehicle charging unit, vehicle charging pad, receiving pad, wireless power converter, inductive power transfer (IDT) device, wireless power receiver, or any other device that may implement a receiver-side beacon mode for wireless charging.

The charge control system 1200 may be integrated with a microprocessor, storage media, I/O logic, data interfaces, logic gates, a wireless power receiver, power rectification and conversion circuitry, firmware, software, or combinations thereof to provide communicative, control, or processing functionalities. The charge control system 1200 may include a data bus (e.g., cross bar or interconnect fabric) enabling communication between the various components of the charge control system 1200 and other components of a wireless charging system. In some aspects, the charge control system 1200 may communicate with a wireless power transmitter or a controller thereof to implement system alignment, configuration, or synchronization.

In this particular example, the charge control system 1200 includes a processor 1202 and memory 1204. The memory 1204 may include any suitable type of memory, such as volatile memory (e.g., DRAM), non-volatile memory (e.g., Flash), and the like. The memory 1204 is implemented as a storage medium, and thus does not include transitory propagating signals or carrier waves. The memory 1204 can store data and processor-executable instructions of the charge control system 1200, such as an operating system 1206 of the system and charging algorithms 1208. The charging algorithms 1208 may include various charging profiles and tuning parameters to enable interoperability between the charge control system 1200 and multiple types or sizes of wireless power receivers. The processor 1202 executes the operating system 1206 and charging algorithms 1208 from the memory 1204 to implement various functions of a wireless charging system associated with the charge control system 1200.

The charge control system 1200 may also include I/O logic 1210 and a wireless transceiver 1212. The I/O logic 1210 can be configured to provide a variety of I/O ports or data interfaces to enable communication with other components of a wireless charging system, such as a power supply, sensors, power transmitting device, or power receiving device. The wireless transceiver 1212 may also enable communication with other components of the wireless charging system or a control system of a wireless power receiver. For example, the charge control system 1200 may communicate with a base charging unit to control an amount or level of power transmitted by the base charging unit to an electric vehicle in which the charge control system 1200 is embodied.

The charge control system 1200 also includes a beacon mode controller 1214, which may be embodied separately or combined with other components described herein. For example, the beacon mode controller 1214 may be integrated with or have access to the charging algorithms 1208 of the charge control system 1200. The beacon mode controller 1214, either independently or in combination with other components, can be implemented as processor-executable instructions stored in the memory 1204 and executed by the processor 1202 to implement a vehicle-side beacon mode or other operations described herein. Alternately or additionally, the beacon mode controller 1214 and other components of charge control system 1200 may be implemented as hardware, fixed-logic circuitry, firmware, or a combination thereof that is implemented in association with I/O logic 1210 or other signal processing circuitry of the charge control system.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. A circuit for receiving wirelessly transmitted power, the circuit comprising:
   a coil to receive the wirelessly transmitted power;
   a first inductor having a first terminal connected to a first terminal of the coil;
   a second inductor having a first terminal connected to a second terminal of the coil;
   power conversion circuitry connected between an energy storage device and at least one respective second terminal of the first inductor or the second inductor; and
   beacon circuitry connected to a voltage source, a lower potential, and the respective second terminals of the first inductor and second inductor, the beacon circuitry including:
   a first switch connected between the voltage source and the second terminal of the first inductor; and
   a second switch connected between the lower potential and the second terminal of the second inductor.

2. The circuit as recited in claim 1, wherein the beacon circuitry further comprises:
   a third switch connected between the voltage source and the second terminal of the second inductor; and
   a fourth switch connected between the lower potential and the second terminal of the first inductor.

3. The circuit as recited in claim 2, wherein the first, second, third, and fourth switches of the beacon circuitry are implemented as an asymmetric H-bridge to drive, from the voltage source, current into the first inductor and second inductor of the circuit to generate a beacon signal.

4. The circuit as recited in claim 1, wherein the second switch is implemented using a larger or higher-rated switch device than the first switch.

5. The circuit as recited in claim 1, wherein the first inductor and the second inductor of the circuit are implemented as DC inductors.

6. The circuit as recited in claim 1, wherein the power conversion circuitry comprises boost circuitry that includes the second switch and a diode connected between the energy storage device and the second terminal of the second inductor.

7. The circuit as recited in claim 1, further comprising a capacitor connected between the first terminal of the coil and the second terminal of the coil.

8. The circuit as recited in claim 1, wherein the beacon circuitry further comprises a diode connected between the first switch and the voltage source.

9. The circuit as recited in claim 1, wherein the voltage source to which the beacon circuitry is connected is the energy storage device to which the power conversion circuitry is connected.

10. The circuit as recited in claim 1, wherein the energy storage device is a rechargeable battery of an electric vehicle and the voltage source to which the beacon circuitry is connected is separate from the rechargeable battery of the electric vehicle.

11. The circuit as recited in claim 10, wherein the voltage source is configured to provide voltage at a higher level than a voltage of the rechargeable battery.

12. The circuit as recited in claim 1, further comprising:
a first diode connected from the first terminal of the coil to the lower potential; or
a second diode connected from the second terminal of the coil to the lower potential.

13. A method for generating a beacon signal to initiate transmission of power by a wireless power transmitter, the method comprising:
generating, via beacon circuitry of a wireless power receiver, alternating current by which to provide the beacon signal, the beacon circuitry including a first switch connected between a voltage source and a first terminal of a first inductor of the wireless power receiver and a second switch connected between a potential that is lower than the voltage source and a first terminal of a second inductor of the wireless power receiver;
applying, through the first inductor and the second inductor of the wireless power receiver, the alternating current to a coil of the wireless power receiver to transmit the beacon signal such that the beacon signal is detectable by the wireless power transmitter, the alternating current applied via a second terminal of the first inductor connected to a first terminal of the coil and via a second terminal of the second inductor connected to a second terminal of the coil;
monitoring the coil of the wireless power receiver for other alternating current indicating reception of power from the wireless power transmitter;
initiating, responsive to detecting the other alternating current and via conversion circuitry of the wireless power receiver, conversion of the other alternating current to direct current using at least a portion of the beacon circuitry of the wireless power receiver, the conversion circuitry being operably coupled between an energy storage device and one of the first inductor or the second inductor; and
charging, with the direct current, the energy storage device operably coupled with the conversion circuitry of the wireless power receiver.

14. The method as recited in claim 13, wherein applying the alternating current to the coil comprises alternately connecting, via the first switch of the beacon circuitry and a third switch of the beacon circuitry that is connected between the voltage source and the second inductor, each of the respective inductors to the voltage source.

15. The method as recited in claim 13, further comprising ceasing, responsive to detecting the other current, the application of the alternating current to the coil of the wireless power receiver.

16. The method as recited in claim 13, wherein a frequency at which the alternating current is applied to the coil of the wireless power receiver is within a range of approximately 75 kHz to 125 kHz.

17. The method as recited in claim 13, further comprising:
altering, over a range of frequencies, a frequency at which the alternating current is applied to the coil of the wireless power receiver;
monitoring, over the range of frequencies, an amount of the alternating current in the coil or an amount of the alternating current drawn by the coil; and
determining, within the range of frequencies, an approximate resonant frequency of the coil based on the monitored amount of current.

18. The method as recited in claim 13, further comprising:
altering, over a range of frequencies, a frequency at which the alternating current is applied to the coil of the wireless power receiver;
receiving, from the wireless power transmitter, an indication of an amplitude of the beacon signal relative the range of frequencies; and
determining, based on the indication, an approximate resonant frequency of the coil of the wireless power receiver.

19. An apparatus for receiving wirelessly transmitted power, the apparatus comprising:
a coil configured to receive wirelessly transmitted power;
a first portion of boost circuitry comprising a first inductor having a first terminal connected to a first terminal of the coil and a second terminal connected to an energy storage device, and a first switch connected between the second terminal of the first inductor and a lower potential;
a second portion of boost circuitry comprising a second inductor having a first terminal connected to a second terminal of the coil and a second terminal connected to the energy storage device, and a second switch connected between the second terminal of the second inductor and the lower potential; and
beacon circuitry comprising a third switch connected between a voltage source and one of the respective second terminals of the first inductor or the second inductor.

20. The apparatus as recited in claim 19, wherein the third switch is connected between the voltage source and the second terminal of the first inductor and the beacon circuitry further comprises a fourth switch connected between the voltage source and the second terminal of the second inductor.

21. The apparatus as recited in claim 20, wherein the first switch or the second switch is implemented using larger switch device than the third switch or the fourth switch.

22. The apparatus as recited in claim 20, wherein:
the third switch or the fourth switch of the beacon circuitry is connected to the voltage source via a first diode; or
the second terminal of the first inductor or the second terminal of the second inductor is connected to the energy storage device via a second diode.

23. The apparatus as recited in claim 19, further comprising current injection circuitry that includes:
a first diode connected from the first terminal of the first inductor to the lower potential; or a second diode connected from the first terminal of the second inductor to the lower potential.

24. The apparatus as recited in claim 19, wherein the coil of the apparatus is tuned to resonate within a range of approximately 75 kHz to 125 kHz.

25. The apparatus as recited in claim 19, wherein the apparatus is embodied as part of a wireless electric vehicle charging system or a dynamic electric vehicle charging system.

26. A wireless power receiver comprising:
   means for generating alternating current by which to provide a beacon signal, the means for generating including a first switch connected between a voltage source and a first terminal of a first inductor of the wireless power receiver and a second switch connected between a potential that is lower than the voltage source and a first terminal of a second inductor of the wireless power receiver;
   means for applying, through the first inductor and the second inductor, the alternating current to terminals of a coil of the wireless power receiver to transmit the beacon signal such that the beacon signal is detectable by a wireless power transmitter, the means for applying including a second terminal of the first inductor that is connected to a first terminal of the coil and a second terminal of the second inductor that is connected to a second terminal of the coil;
   means for monitoring the coil of the wireless power receiver for other alternating current indicating reception of the power from the wireless power transmitter;
   means for converting, in response to detecting the other alternating current, the other alternating current of the received power to direct current, the means for converting coupled between an energy storage device and one of the first inductor or the second inductor; and
   means for charging, with the direct current, the energy storage device operably coupled with the means for converting of the wireless power receiver.

27. The wireless power receiver as recited in claim 26, wherein the means for applying the alternating current comprise an asymmetric H-bridge connected to the respective inductors, the asymmetric H-bridge including the first switch and the second switch of the means for applying.

28. The wireless power receiver as recited in claim 27, wherein the means for converting the other alternating current to the direct current comprise at least a portion of the asymmetric H-bridge.

29. The wireless power receiver as recited in claim 26, further comprising means for determining a resonant frequency of the coil of the wireless power receiver.

30. The method as recited in claim 14, wherein:
   the beacon circuitry further comprises a fourth switch connected between the first inductor and the potential that is lower than the voltage source; and
   the first switch, the second switch, the third switch, and the fourth switch of the beacon circuitry are implemented as an asymmetric H-bridge to drive, from the voltage source, current into the first inductor and second inductor of the circuit to generate the beacon signal.

* * * * *